United States Patent
Galmiche et al.

(10) Patent No.: US 11,381,135 B2
(45) Date of Patent: Jul. 5, 2022

(54) ROTOR FOR ASYNCHRONOUS ELECTRICAL MACHINE WITH NON-THROUGH SHAFT AND ASSOCIATED ELECTRICAL MACHINE

(71) Applicant: GE Energy Power Conversion Technology Limited, Warwickshire (GB)

(72) Inventors: Christophe Galmiche, Toul (FR); Nicolas Velly, Frouard (FR); Mathieu Bittermann, Maxeville (FR); Lionel Durantay, Frouard (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 266 days.

(21) Appl. No.: 16/575,336

(22) Filed: Sep. 18, 2019

(65) Prior Publication Data
US 2020/0161936 A1    May 21, 2020

(51) Int. Cl.
*H02K 9/19* (2006.01)
*H02K 1/18* (2006.01)
*H02K 3/24* (2006.01)
*H02K 5/173* (2006.01)
*H02K 17/16* (2006.01)
*H02K 9/00* (2006.01)

(52) U.S. Cl.
CPC .............. *H02K 9/19* (2013.01); *H02K 1/18* (2013.01); *H02K 3/24* (2013.01); *H02K 5/1732* (2013.01); *H02K 9/00* (2013.01); *H02K 17/16* (2013.01)

(58) Field of Classification Search
CPC ............ H02K 1/18; H02K 17/16; H02K 3/24; H02K 5/173; H02K 9/00; H02K 9/19
See application file for complete search history.

(56) References Cited

U.S. PATENT DOCUMENTS

| | | | |
|---|---|---|---|
| 6,879,069 B1 * | 4/2005 | Weidman ................. | H02K 9/19 310/61 |
| 7,061,148 B2 * | 6/2006 | Philippart ................ | B63H 5/07 310/58 |
| 8,928,195 B2 * | 1/2015 | Ohashi .................... | H02K 7/088 310/54 |
| 9,312,735 B2 * | 4/2016 | Takasaki .................. | H02K 3/38 |
| 10,594,190 B2 * | 3/2020 | Tremelling ............ | H02K 15/03 |
| 2019/0181736 A1 * | 6/2019 | Frohlich ............ | H02K 15/0012 |

FOREIGN PATENT DOCUMENTS

WO    WO-2018108968 A1 *  6/2018 ............... H02K 9/19

* cited by examiner

*Primary Examiner* — Tran N Nguyen
*Assistant Examiner* — Leda T Pham
(74) *Attorney, Agent, or Firm* — Wood IP LLC

(57) ABSTRACT

Provided is a rotor for an asynchronous rotary electrical machine with non-through shaft that includes a cylindrical magnetic mass gripped between two mounting flanges of two half-shafts, a cooling means capable of cooling the rotor and conductive bars housed within the magnetic mass and distributed substantially uniformly over a diameter of the magnetic mass. The cooling means includes, for each conductive bar, at least one cooling channel, opening onto the conductive bar according to an axial direction and located within the magnetic mass and at least one through hole arranged within each conductive bar in such a way that the cooling channel communicates with at least one hole arranged on the outer periphery of the magnetic mass.

18 Claims, 12 Drawing Sheets

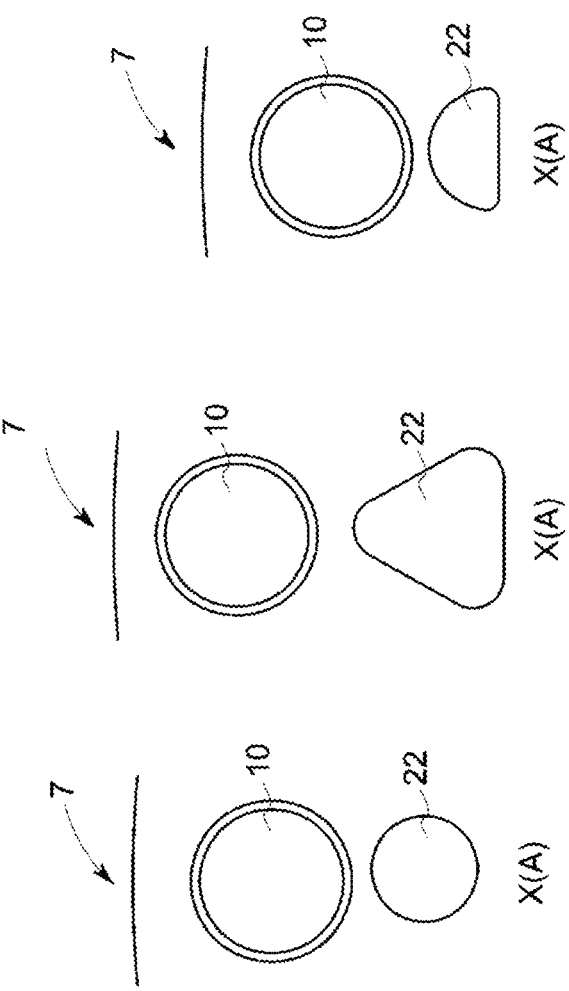

ROTOR FOR ASYNCHRONOUS ELECTRICAL MACHINE WITH NON-THROUGH SHAFT AND ASSOCIATED ELECTRICAL MACHINE

The present invention relates to asynchronous squirrel cage rotary electrical machines and more particularly to the cooling of a rotor comprising a non-through shaft.

This invention also relates to a rotary electrical machine comprising such a rotor.

A rotating rotor having a squirrel-cage heats up under the effect of the currents passing through the squirrel cage.

The heating of the rotor reduces the overall efficiency of the electrical machine as well as the available electrical power thereof.

Documents EP0225440 and U.S. Pat. No. 6,345,433 describe a rotor for an asynchronous electrical machine comprising grooves arranged uniformly on the outer peripheral surface of the magnetic mass of the rotor.

The grooves are however dimensioned in such a way as to deflect the induced currents in order to reduce the magnetic losses within the magnetic mass.

Furthermore, in document U.S. Pat. No. 6,345,433, the rotor comprises a through shaft, and the document EP0225440 discloses a rotor comprising a monobloc shaft.

It is therefore proposed to alleviate the drawbacks of rotors for squirrel cage asynchronous rotary electrical machine according to the state of the art.

In view of the foregoing, the invention proposes, according to one aspect, a rotor for asynchronous rotary electrical machine with non-through shaft comprising a cylindrical magnetic mass gripped between two mounting flanges of two half-shafts.

It comprises cooling means that are able to cool the rotor.

Preferably, the cooling means comprise grooves on the peripheral surface of the magnetic mass, oriented in an axial direction, or else circumferential grooves on the peripheral surface of the magnetic mass.

According to one feature, the rotor further comprises conductive bars housed within the magnetic mass and distributed substantially uniformly over a diameter of the magnetic mass, the cooling means comprising, for each conductive bar, at least one cooling channel, opening onto the bar according to an axial direction and located within the magnetic mass and at least one through hole arranged within each bar in such a way that the cooling channel communicates with at least one hole arranged on the outer periphery of the magnetic mass.

Preferably, the rotor further comprises supply means for supplying cooling fluid to the cooling means and connected to the cooling means.

Advantageously, the cooling channel is located between the conductive bar and an axis of rotation of the rotor.

Preferably, the cooling means further comprise a second cooling channel supplied by the supply means for each conductive bar and located between the outer periphery of the magnetic mass and the conductive bar.

Preferably, each end of the rotor comprises supply means.

Advantageously, the rotor further comprises a separation member arranged within the cooling channel between at least two peripheral holes in such a way as to separate the flows of coolant fluid flowing from each end of the rotor.

Preferably, the channel comprises at least one support member intended to support the conductive bar and such that the passage cross-section of the fluid around the support element is identical to the passage cross-section of the cooling channel.

Advantageously, the through holes are arranged on the conductive bar in such a way as to cool the hottest part of the conductive bar.

According to another feature, the rotor comprises conductive bars housed within the magnetic mass and uniformly distributed over a diameter of the magnetic mass, the cooling means comprising cooling channels extending in an axial direction within the magnetic mass and located between the conductive bars and a axis of rotation of the rotor such as not to communicate with the conductive bars.

Advantageously, the channels are arranged between two adjacent conductive bars.

Preferably, the cooling channels are arranged beneath the conductive bars, within planes that are substantially central in relation to the bars.

According to yet another feature, the rotor further comprises discharge channels connecting the cooling channels to holes arranged on the outer peripheral surface of the magnetic mass.

According to yet another feature, the rotor further comprises at least one short-circuit disc at one end of the magnetic mass and supply means located within the short-circuit disc intended to supply cooling fluid to the cooling means.

Preferably, the short-circuit disc comprises, on the outer peripheral surface thereof, grooves oriented in an axial direction or else circumferential grooves.

Advantageously, the magnetic mass comprises compacted magnetic sheets.

Preferably, the magnetic mass comprises a monobloc body.

Advantageously, the magnetic mass comprises a stack of metal plates.

According to another aspect, an asynchronous rotary electrical machine is proposed comprising a rotor as defined above.

Other characteristics and advantages of the invention will emerge on reading the following description of the embodiments of the invention, provided solely by way of non-limiting examples and with reference to the drawings in which:

FIGS. 14 to 29 show the profiles of the cooling channel.

Figure 1:
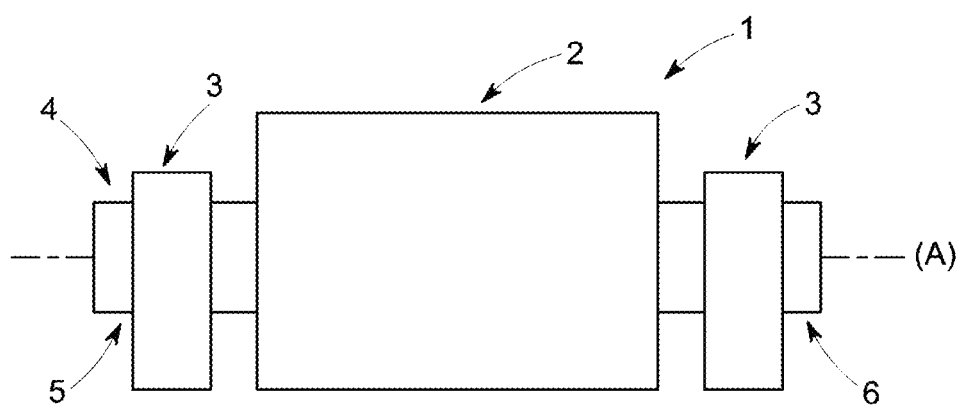
FIG. 1 shows an embodiment of an asynchronous rotary electrical machine.

Referring to FIG. 1, illustrated is one embodiment of an asynchronous rotary electrical machine 1 comprising a stator 2, bearings 3 and a rotor 4 inserted into the stator 2 and the bearings 3.

The rotor 4 comprises a non-through rotary shaft comprising two half-shafts 5 and 6 and an axis (A) coincident with the axis of rotation of the rotor 4.

The rotor 4 comprises a non-through rotary shaft made for example of steel, an axis (A) coincident with the axis of rotation of the rotor 4 and cooling means that are able to cool the rotor 4.

The asynchronous rotary electrical machine 1 is for example incorporated into a motor compressor.

The rotor 4 is immersed in the gas that is cooling the rotor, for example the gas that is compressed by the motor compressor.

Figure 2:
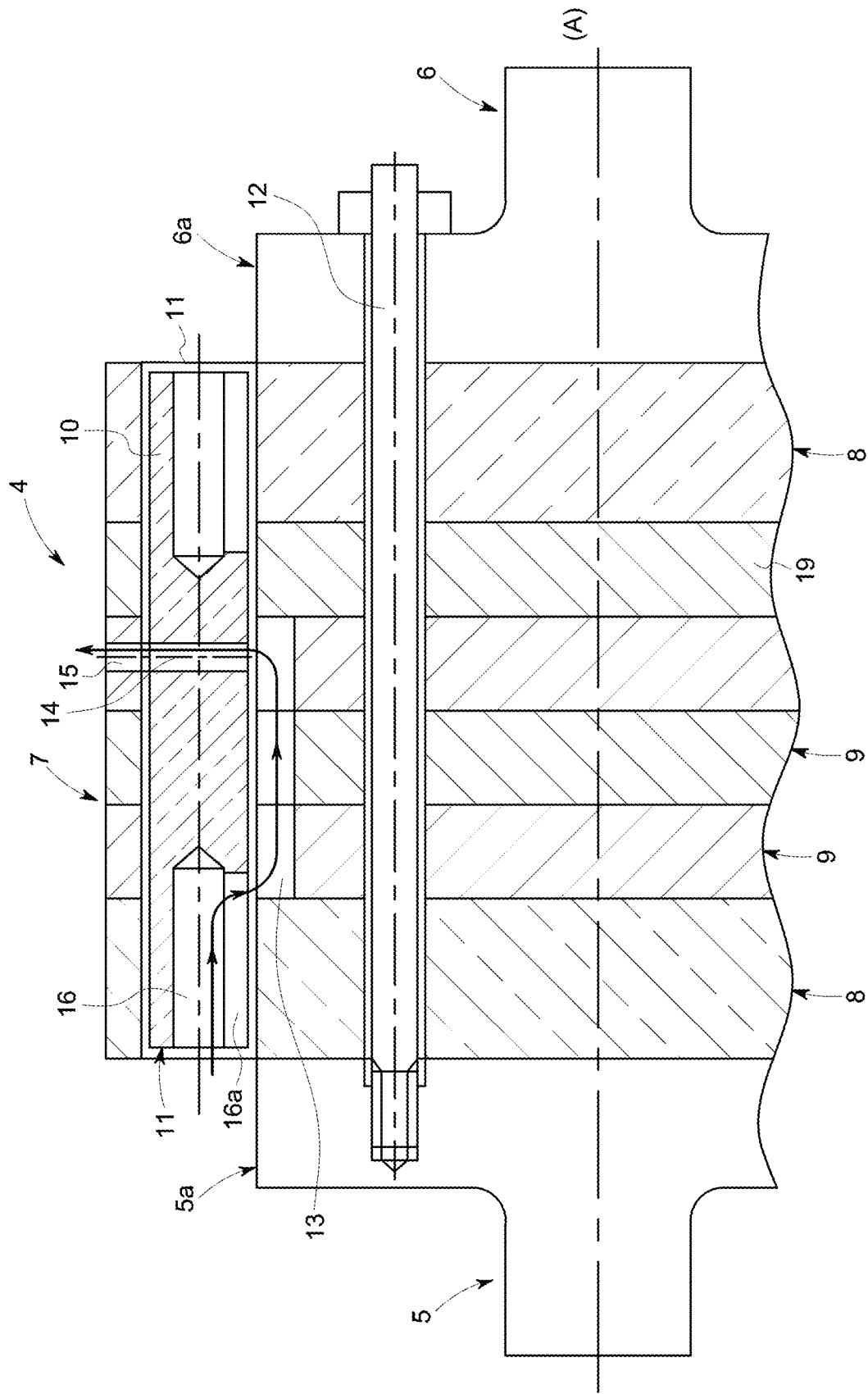
FIG. 2 shows a first embodiment of the rotor with non-through shaft.

As shown in FIG. 2, the rotor 4 comprises two half-shafts 5 and 6 respectively, comprising a mounting flange 5a and 6a enclosing a cylindrical magnetic mass 7 and two short-circuit discs 8 each interposed between a half-shaft and one of the ends of the magnetic mass 7.

The magnetic mass 7 comprises metal plates 9 comprising housings accommodating conductive bars 10 uniformly distributed over a diameter of the magnetic mass 7.

The housings are dimensioned in such a way as to compensate for the expansion of the conductive bars 10 under the effect of heat generated by the passage of current during the operation thereof and thereby to prevent a thermo-mechanical imbalance.

The short-circuit discs 8 and the conductive bars 10 are made for example of copper and are electrically interconnected in order to form a squirrel cage when the rotor is driven with a rotational movement.

Each short-circuit disc 8 comprises through-holes 11 wherein the ends of each conductive bar 10 are respectively housed. Each end of conductive bar is inserted into a hole 11 with a clearance in order to compensate for the expansion of the conductive bars 16 under the effect of the heat generated by the passage of the current during operation.

When the rotor 4 is driven in a rotational movement at a speed of, for example, 30 000 rpm, the bars 10 are projected outwards from the magnetic mass 7 under the effect of centrifugal force.

The bars 10 come into contact with the short-circuit discs 8.

Tie rods 12 hold the compacted magnetic mass 7 between the half-shafts 5 and 6.

In a variant that is not shown, the metal plates 9 are assembled in pairs by means of screws wherein the head is embedded within the thickness of the plate, and the half-shafts 5 and 6 are attached to the magnetic mass 7 by means of screws.

According to still another variant, not shown, the metal plates 9 are assembled and compacted by tie rods connecting the two end plates and the half-shafts 5 and 6 are attached to the magnetic mass 7 by means of screws.

The cooling means of the rotor 4 comprise a cooling channel 13 opening onto the bar in an axial direction within the magnetic mass 7 and a through hole 14 arranged within the conductive bar 10 that is preferably substantially radial in such a way that the cooling channel 13 communicates with a hole 15 arranged on the outer peripheral surface of the magnetic mass 7.

Of course, each of the conductive bars 10 of the rotor 4 comprises cooling means.

The channel 13 is located between the conductive bar 10 and the axis of rotation (A) of the rotor.

The rotor 4 further comprises means for supplying cooling fluid to the cooling means.

The supply means comprise at one end of each conductive bar 10 a blind hole 16 oriented along an axial direction and a slot 16a opening onto the blind hole 16 in an axial direction, in such a way that a cooling fluid flows into the blind hole 16, then into the slot 16a in order to flow into the channel 13.

The outer diameter of the half-shaft 5 at the end of the rotor having the blind hole 16 is selected so that the cooling fluid flows from the rotor exterior toward the blind hole 16, that is to say the outer diameter of the half-shaft does not block the blind holes 16.

The cooling fluid is for example the gas surrounding the rotor 4, this gas may be the gas that is compressed by the motor compressor or any other type of gas, for example air or nitrogen.

As a variant, the half-shaft 5 comprises a hole opening out in a substantially axial direction such that the cooling fluid flows from the exterior of the rotor 4 towards the blind hole 16.

The channel 13 is for example substantially circular and of a diameter that is different from that of the through hole 14.

The difference in diameters of the channel 13 and the through hole 14 creates, under the effect of centrifugal force, suction of the cooling fluid from the blind hole 16 towards the hole referenced 15.

Since the supply means are arranged at one end of the rotor 4, the cooling is unilateral.

The magnetic mass 7 also comprises a separation member 19 formed by a metal plate in such a way as to block the channel 13 opposite the cooling fluid inlet to order to force the fluid to flow radially through the peripheral holes 15.

In the following text, those elements that are identical to those described above are identified by the same alphanumeric references.

Figure 3:
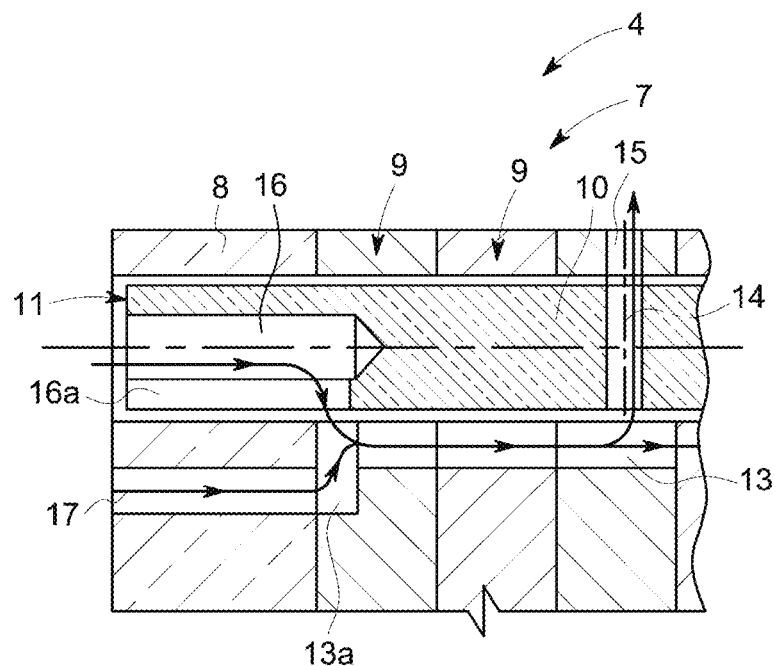
FIG. 3 shows a second embodiment of the rotor with non-through shaft.

A second embodiment of the rotor 4 shown in FIG. 3 shows a partial cross-section along an axial direction of the magnetic mass 7 comprising the metal plates 9, the short-circuit disc 8 and the bar 10, and differs from the previous embodiment in that the supply means further comprise a through hole 17 in a substantially axial direction arranged within the short-circuit disc 8 such that the cooling fluid passing through the short-circuit disc 8 flows into the channel 13, the metal plate(s) 9 at the ends of the magnetic mass 7 comprising a channel 13a such that the cooling fluid flows from the through hole 17 towards the channel 13.

In a variant, the half-shafts 5 and 6 comprise holes opening out in a substantially axial direction such that the cooling fluid flows from the exterior of the rotor 4 towards the blind hole 16 and the through hole 17.

Figure 4:
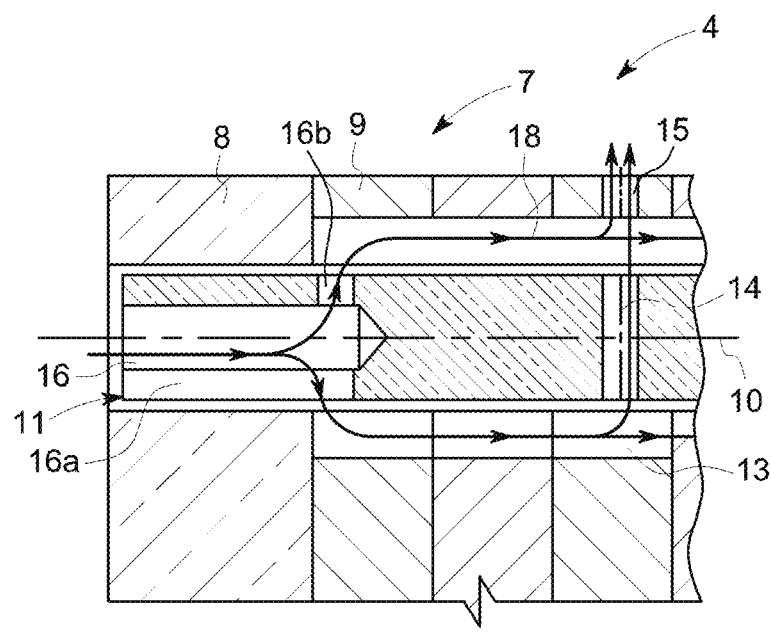
FIG. 4 shows a third embodiment of the rotor with non-through shaft.

FIG. 4 shows a partial section of the magnetic mass 7 in an axial direction according to a third embodiment and it differs from the first embodiment in that the cooling means further comprise a second cooling channel 18 that is supplied by means of the supply means and located between the outer periphery of the magnetic mass 7 and the conductive bar 10, the supply means further comprising a through hole 16b in a substantially radial direction oriented towards the plate 9 and opening out onto the blind hole 16.

The through hole 16b supplies the second channel 18 with cooling fluid.

In a variant, not shown, the bar 10 comprises a blind hole 16 and a through hole 16b supplying a cooling channel arranged between the outer periphery of the magnetic mass 7 and the conductive bar 10.

According to another variant, not shown, the short-circuit disc 8 comprises a through hole 17 communicating with the channels 13 and 13a, the channel 13a communicating with the through hole 14 in order to supply the second channel 18 with cooling fluid.

In a variant, not shown, the rotor comprises two holes 11 and 17 as shown in FIGS. 3 and 4, supplying the channels 13 and 18 by means of the holes 16a and 16b.

Figure 5:
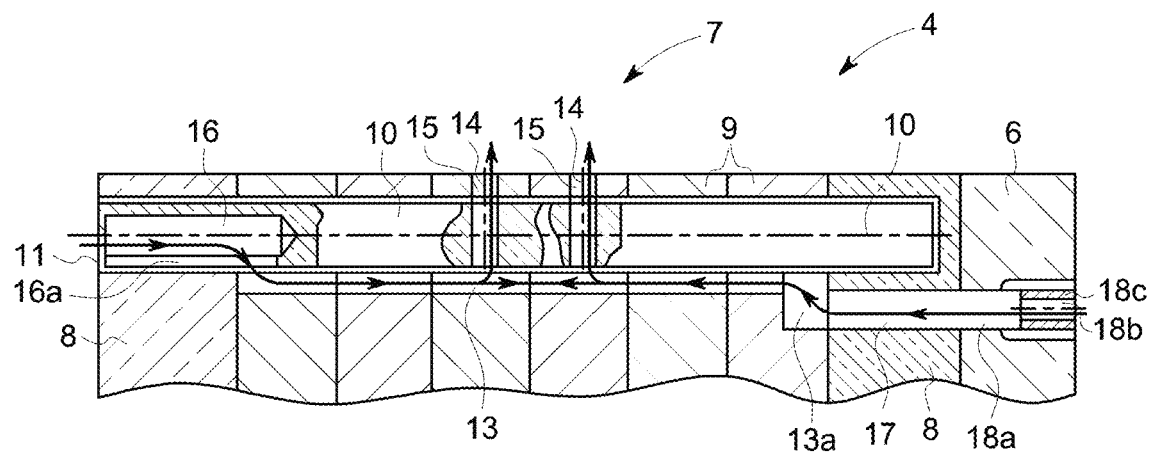
FIG. 5 shows a fourth embodiment of the rotor with non-through shaft.

A fourth embodiment is shown in FIG. 5, showing a partial cross-section of the magnetic mass 7 in an axial direction. This embodiment differs from the first embodiment in that both ends of the rotor 4 comprise supply means and in that one end of the conductive bar 10 is encapsulated, with a radial and axial clearance within the short-circuit disc 8.

A first end of the rotor comprises supply means according to the first embodiment of the rotor 4 and the second end of the rotor 4 comprises supply means according to the second embodiment, without the blind hole 16.

Since each end of the rotor 4 comprises supply means, the cooling of the rotor 4 is bilateral.

The through hole 17 comprises a circular hole that is coaxial with a circular hole 18a opening from the half-shaft 6.

The hole, referenced 18a, comprises a threaded hole at the end thereof and opening towards the exterior, said hole, receiving a plug 18c, is provided with a hole 18b that is axial and substantially coaxial to the holes 18a and 18b. Said hole is calibrated in such a way as to set the flow rate of cooling fluid through the through hole 18a to a predetermined value.

The predetermined value is set for example by means of cooling tests of the rotor 4.

As a variant, the hole referenced 18a does not comprise a calibrated hole.

In other embodiments, the rotor 4 comprises identical or different supply means at the ends thereof.

The holes referenced 14 and 15 are circular and coaxial.

In variants, the holes referenced 14 and 15 may not be coaxial.

Figure 6:
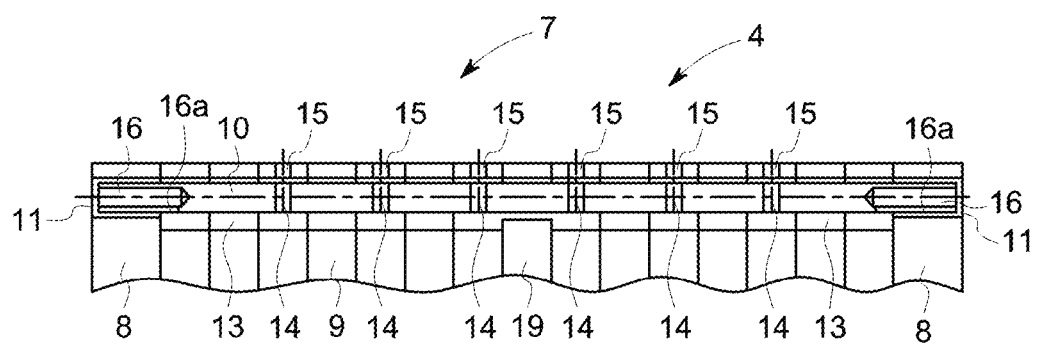
FIG. 6 shows a fifth embodiment of the rotor with non-through shaft.

Reference is now made to FIG. 6, which shows another embodiment of the router 4.

This embodiment differs from the previous embodiment in that the supply means at the ends of the rotor 4 are identical and each comprises a blind hole 16 and a slot 16a.

The magnetic mass 7 further comprises a separation member 19 arranged within the cooling channel 13 between at least two peripheral holes 15 in such a way as to separate the flows of coolant fluid flowing from each end of the rotor 4.

The bar 10 comprises, for example, six through holes 14 evenly distributed on the 10 bar and coaxial to the peripheral holes 15.

In a variant, the through holes 14 are arranged non-uniformly on the conductive bar 10 in such a way as to cool the hottest part of the conductive bar, generally, in the case of bilateral type cooling, the central area of the bar, or, in the case of unilateral cooling, on the area opposite the fluid inlet.

According to other embodiments, the channel 13 comprises at least one support member for supporting the conductive bar 10, such that the passage cross-section of the fluid around the support element is identical to the passage cross-section of the cooling channel 13.

In a variant, not shown, the rotor 4 comprises the cooling channels 13 and 18, a supply means as described in FIG. 4 and through holes 14 arranged uniformly, or not uniformly, on the conductive bar 10.

The rotor further comprises peripheral holes 15, that are coaxial, or not coaxial, to the holes 14 in such a way as to perform unilateral or bilateral cooling of the rotor 4.

One or more separation members 19 may be arranged opposite the fluid inlet or are arranged substantially at the center of the axial length of the magnetic mass 7 such as to perform bilateral cooling of the rotor 4.

Figure 7:
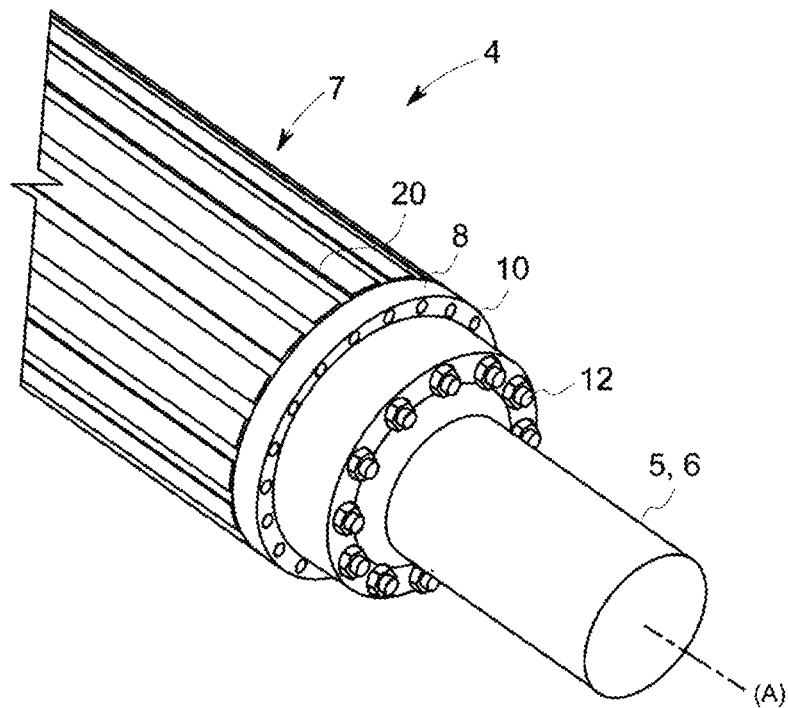
FIG. 7 shows a sixth embodiment of the rotor with non-through shaft.
Figure 8:
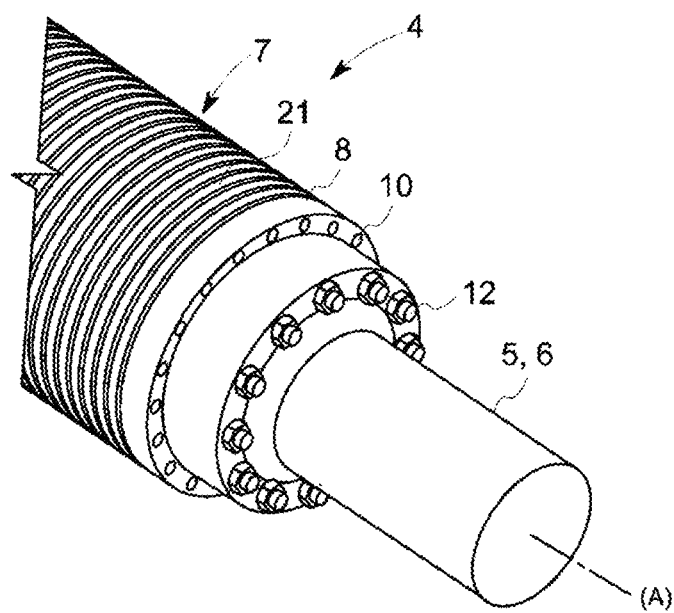
FIG. 8 shows a seventh embodiment of the rotor with non-through shaft.

FIGS. 7 and 8 show other embodiments of the rotor 4, increasing the exchange surface between the outer peripheral surface of the magnetic mass 7 and the cooling fluid.

In the embodiment shown in FIG. 7, the cooling means comprise grooves 20 on the outer peripheral surface of the magnetic mass 7, oriented in an axial direction, and in the embodiment shown in FIG. 8 the cooling means comprise circumferential grooves 21 on the outer peripheral surface of the magnetic mass 7.

The grooves referenced 20 and 21 may be square, rectangular, trapezoidal, triangular or undulating.

The depth of the grooves 20 and 21 is determined according to the required increase in the external exchange surface of the magnetic mass 7 and the radial space available between the periphery of the magnetic mass 7 and the conductive bars 10.

The grooves 20 and 21 can be obtained for example by machining the plates 9 or the monobloc body, and machining the magnetic sheets once compacted.

In a variant, the grooves 20 are cut into each magnetic sheet and the grooves 21 are for example obtained by means of differing outer diameters cut into two versions of the magnetic sheets.

Embodiments of the cooling means shown in FIGS. 7 and 8 can be combined with the embodiments of the rotor 4 described above.

In a variant not shown, the short-circuit discs 8 and/or the mounting flanges 5a and 6a can also comprise, on the outer peripheral surface thereof, grooves oriented in an axial direction or circumferential grooves.

Reference is made to FIGS. 9 to 13 which illustrate other embodiments of the rotor 4, wherein the cooling means comprise cooling channels 22 extending in an axial direction within the magnetic mass 7, and are located between the conductive bars 10 and the axis (A) of rotation of the rotor such as not to come into contact with the bars 10.

The cooling fluid may contain components that can damage the conductive bars 10, for example corrosive or chemically aggressive components contained within the gas.

Moreover, the cooling fluid enters the rotor under high pressure, for example at a pressure of 50 to 200 bar when the rotor 4 is cooled by gas from the compressor, for example in the case of a motor compressor.

Thus, the high pressure cooling fluid has a higher density than the fluid at atmospheric pressure. As a result, the cooling capacity of the high-pressure fluid is increased in relation to that of the fluid at atmospheric pressure.

The cooling fluid is likely to erode the conductive bars 10 by removing particles of material from the conductive bars, particularly at high pressure.

According to the embodiments shown in FIGS. 9 to 13 and 24 to 29, the conductive bars 10 are not in contact with the cooling fluid, thereby preventing deterioration due to abrasion and/or corrosion.

Figure 9:
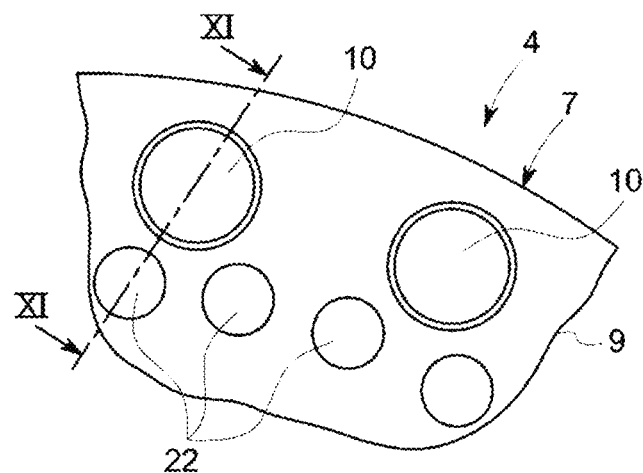
FIG. 9 shows an eighth embodiment of the rotor with non-through shaft.

FIG. 9 shows a partial cross-section along a radial direction of an embodiment of the rotor 4.

It shows the metal plate 9 and the conductive bars 10 and the cooling means comprising cooling channels 22 extending in an axial direction within the magnetic mass 7 and located between or beneath the conductive bars 10 and the axis (A) of rotation of the rotor in such a way as to communicate with the bars 10.

The cooling channels 22 are arranged between two adjacent conductive bars 10 and/or beneath the bars 10.

Figure 10:
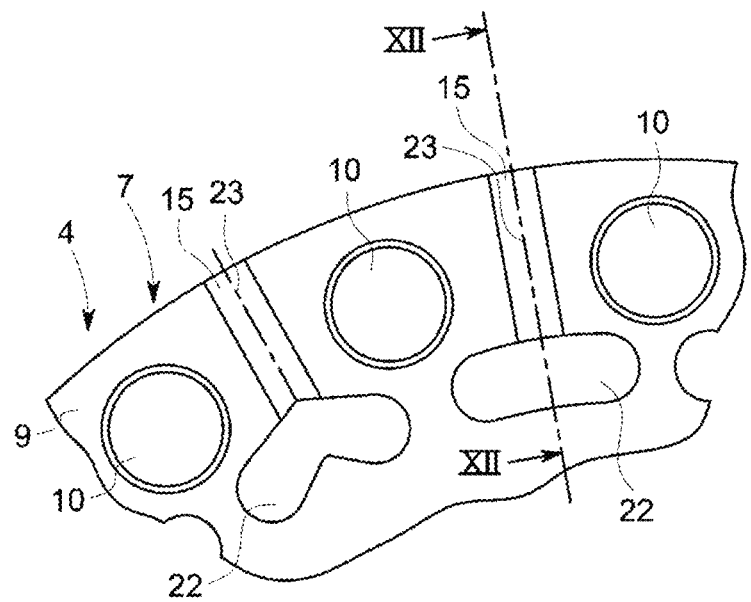
FIG. 10 shows a ninth embodiment of the rotor with non-through shaft.

Referring more particularly to FIG. 10, which illustrates a partial cross-section along a radial direction of another embodiment of the rotor 4 which differs from the previous embodiment in that the cooling channels 22 are arranged between two consecutive bars 10 and are connected to substantially radial outlet channels 23 connecting the cooling channels 22 to the holes referenced 15 arranged on the outer periphery of the magnetic mass 7.

The cooling channels referenced 22 may be, for example, of circular cross-section as shown in FIG. 9, oblong as shown in FIG. 10, triangular or half-moon.

Each cooling channel 22 is supplied with cooling fluid by supply means.

As a variant, the rotor comprises plates as shown in FIG. 10 wherein each channel 22, of an oblong shape, collects the fluid from two cooling channels as described in FIG. 9.

Figure 11:
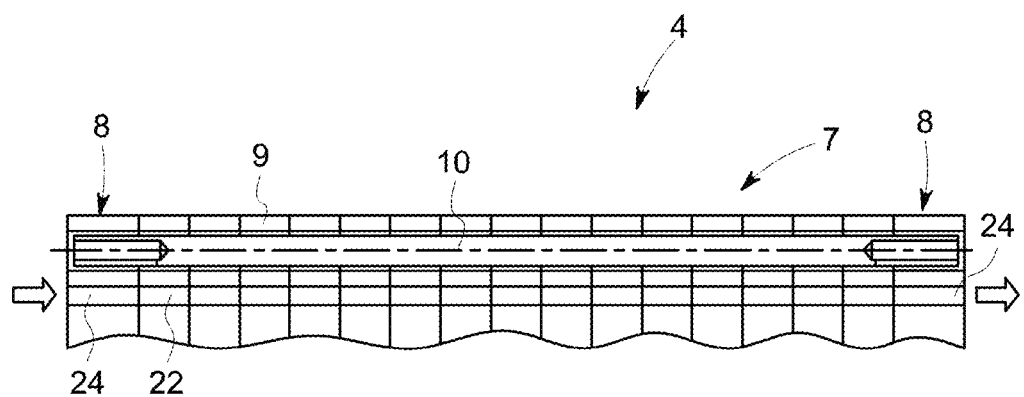
FIG. 11 shows a partial cross-section of an eighth embodiment of the rotor with non-through shaft.

FIG. 11 shows a partial cross-section along a radial direction XI-XI of the rotor 4 shown in FIG. 9.

The supply means comprise a through hole 24 along an axial direction arranged within the short-circuit disc 8 in such a way as to supply the cooling channel 22.

Each end of the rotor 4 comprises a through hole 24.

Of course, as described above, the outer diameter of the half-shaft at the end of the rotor comprising the through hole referenced 24, is selected such that the cooling fluid flows from the exterior of the rotor towards the cooling channel 22, such as not to block the holes 24.

In a variant, the half-shaft comprises a hole opening out such that the cooling fluid flows from the exterior of the rotor towards the cooling channel referenced 22.

In a variant shown in FIGS. 24 to 26, the channel 22 can be located beneath each bar in a substantially median plane, the channel 22 being of a different shape, for example round or triangular.

Figure 12:
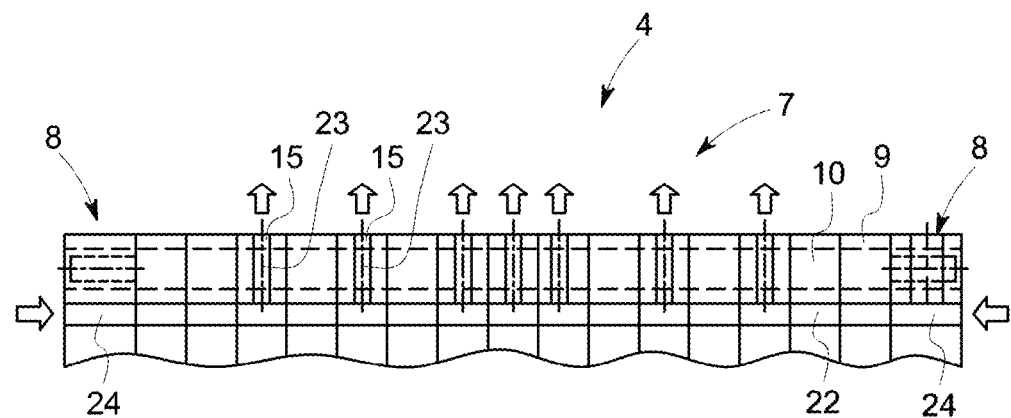
FIG. 12 shows a partial cross-section of a ninth embodiment of the rotor with non-through shaft.

FIG. 12 shows a partial cross-section along a direction XII-XII of the rotor 4 shown in FIG. 10 of bilateral cooling.

In a variant, not shown, the rotor 4 comprises a single inlet 24, channels 23 that are evenly distributed or not evenly distributed, a plate 9 having a separation 19 located opposite the inlet 24 and after the last channel 23 thereby providing unilateral cooling.

This partial cross-section differs from the preceding partial cross-section in that the outlet channels 23 are substantially radial and in that the bars 10 are encapsulated, with an axial and radial clearance within the short-circuit disc 8.

Figure 13:
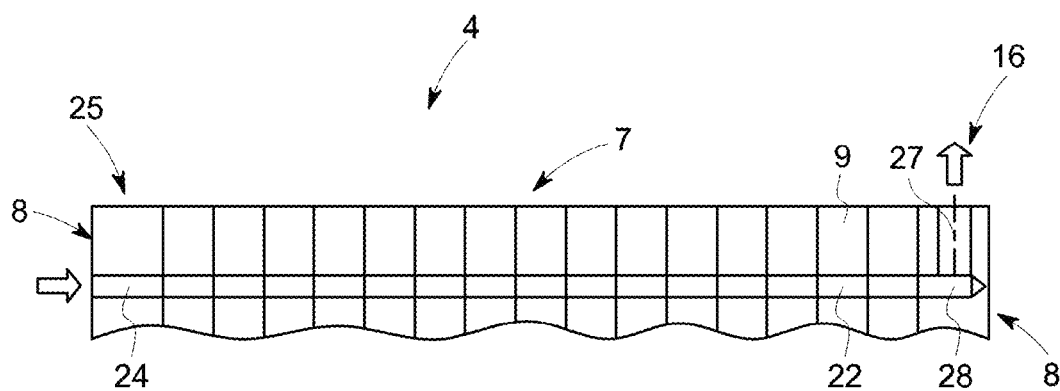
FIG. 13 shows a tenth embodiment of the rotor with non-through shaft.

FIG. 13 shows a partial cross-section along an axial direction of another embodiment of the rotor 4, differing from the embodiment shown in FIG. 11 in that the supply means at each end of the rotor 4 are of a different type.

A first end 25 of the rotor 4 comprises supply means according to the supply means described in FIG. 11 and the second end 26 of the rotor 4 comprises supply means comprising a blind hole 27, in a substantially radial direction, communicating with a blind hole 28 in an axial direction in such a way as to axially and radially discharge the fluid from the cooling channel 22.

This is unilateral cooling.

In a variant not shown, the radial discharge of the cooling fluid is performed by at least one plate 9 having a blind hole 28 in an axial direction and a substantially radial blind hole 27.

According to a further variant, two or more plates 9 comprise a substantially radial blind hole 27 communicating with the channel 22, the end of channel 22 opposite to the inlet 24 being blocked by a separation 19 or by the short-circuit disc 8 without a hole.

According to another variant, not shown, one inlet hole 24 out of two, located on a diameter of the first end 25 and one blind hole 27 out of two, located at the second end 26, are supplied with cooling fluid such that the fluid enters through the supplied hole 24 and exits through the hole 27, passing through the channel 22, and alternatively one inlet hole 24 out of two located on a diameter of the second end 26 and one blind hole 27 out of two located at the first end 25 are supplied with cooling fluid such that the fluid enters through hole 24 and exits through the hole 27 through another channel 22.

Thus, for one channel 22 out of two the cooling fluid enters at the first end 25 and exits at the second end 26, and for the second channel 22, the fluid enters at the second end 26 and exits at the first end 25.

The flows of coolant circulate within the channels 22 unilaterally, and the cooling of the rotor is cross-flow bilateral.

According to other embodiments, the cross-flow bilateral cooling can be achieved with channels 13 and/or 18 which communicate with the conductive bars 10.

In a variant, the plates 9 at the ends of the rotor alternatively comprise one through hole 24 out of two or one axial blind hole 28 out of two communicating with a substantially radial blind hole 27.

The embodiments of the cooling means shown in FIGS. 7 and 8 can be combined with the embodiments of the cooling means described in FIGS. 2 to 6 and 9 to 13.

In the embodiments of the rotor 4 described above, the magnetic mass 7 comprises metal plates.

According to other embodiments for the cooling of the rotor 4, the magnetic mass 7 may comprise a monobloc body.

According to other embodiments for the cooling of the rotor 4, the magnetic mass 7 may comprise magnetic sheets of a thickness of less than 2 mm, preferably between 0.5 and 0.65 mm and compacted in such a way as to form a laminated rotor.

The rotor 4 comprising magnetic sheets with a thickness of less than 2 mm may comprise the cooling and supply means described above.

The profiles of the channels machined into the plates 9 can be obtained by the direct cutting of the magnetic sheets with a cutting tool.

In order to limit the number of cutting tools, a limited number of channel profiles is selected.

Figure 14:
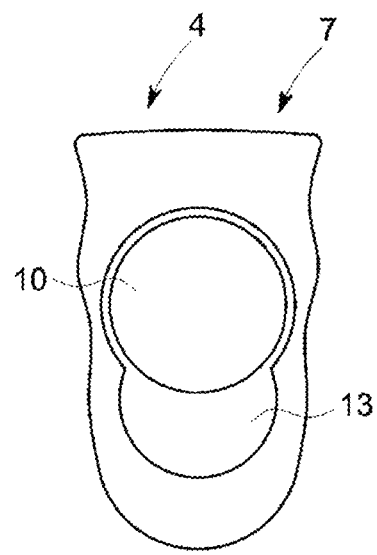
Figure 15:
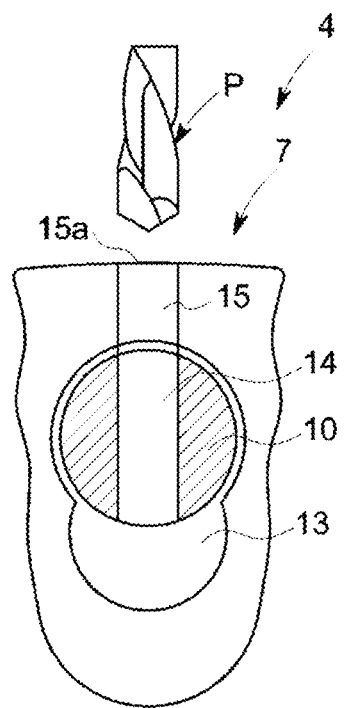

FIGS. 14 and 15 show examples of cut profiles of the channel 13.

The profile shown in FIG. 14 comprises the channel 13, and the profile shown in FIG. 15 comprises the channel 13 and a slot 15 for discharging the fluid.

The two profiles shown in FIGS. 14 and 15 comprise a hole receiving the bar 10.

For example, an assembly of twenty magnetic sheets of a thickness of 0.5 mm with a profile that is identical to that shown in FIG. 15, each sheet having on the periphery an 8 mm slot 15 between the periphery of the magnetic mass and the bar, the assembly forms a rectangular peripheral hole 15a with the dimensions, when the sheets are compacted, of eight mm by ten mm The peripheral hole 15a, combined with a coaxial through hole 14 in the bar 10, makes it possible to evacuate the cooling fluid.

As a variant, the peripheral hole 15a may be machined into the magnetic sheets when the magnetic mass 7 is compacted as shown in FIG. 15, by means of a drilling operation P.

Advantageously, a single profile as shown in FIG. 14 is cut into the magnetic sheets of the magnetic mass 7.

According to yet another variant, the peripheral hole 15a and the through hole 14 within the conductive bar 10 can be machined during the same drilling operation P, in such a way that the holes are coaxial, the bars 10 having been inserted into the magnetic mass 7 beforehand.

According to other embodiments, the separation 19 or a blocking member for the cooling channels within the magnetic mass 7 comprising thin compacted magnetic sheets, can be achieved by means of cut magnetic sheets with a hole receiving the bar 10 without a cooling channel or by means of blocking the channel 13 and/or 18 by the face of the short-circuit disc 8 in contact with the magnetic mass 7.

FIGS. 16, 17, 18, 19 and 20 show examples of profiles which can be machined into the plates 9 or cut into the magnetic sheets.

Figure 16:
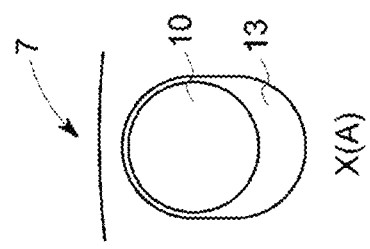
Figure 17:
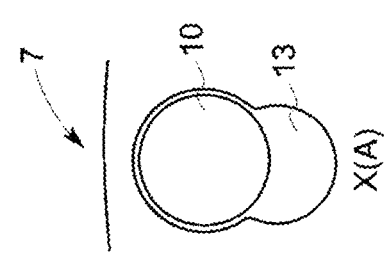

In contrast to the profile shown in FIG. 17, the profile shown in FIG. 16 does not support the conductive bar 10 in a radial direction towards the axis of rotation (A) of the rotor.

Figure 18:
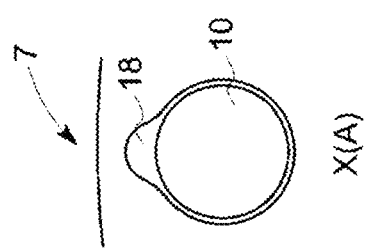

The profile shown in FIG. 18 shows an exemplary profile of the channel 18 without the channel 13.

Figure 19:
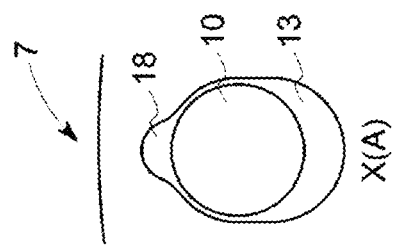
Figure 20:
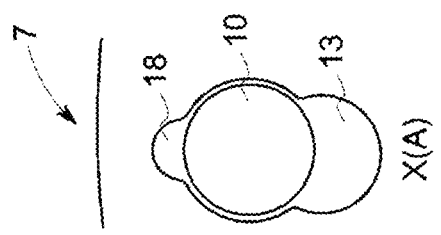

The profile shown in FIG. 19 shows an example of a profile with the channels referenced 13 and 18, the profile shown in FIG. 19 being unable to support the bar 10, unlike the profile shown in FIG. 20 which supports the bar 10 in a radial direction directed towards the axis of rotation (A).

Figure 21:
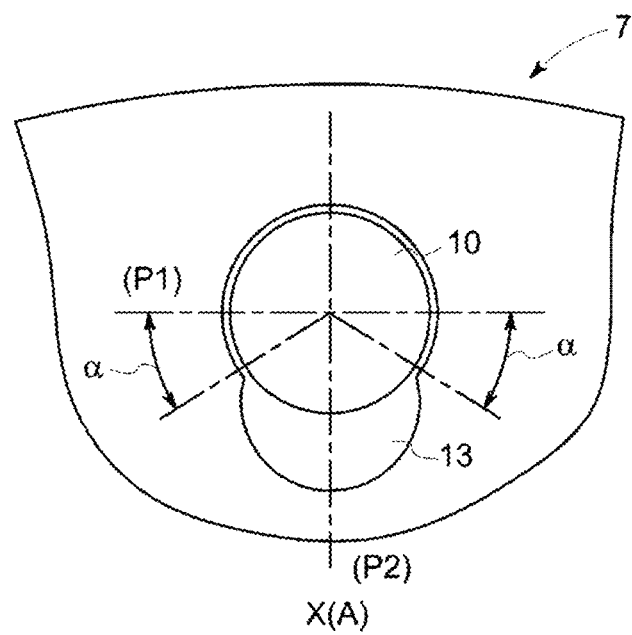

FIG. 21 shows in detail the shape of an example of a channel 13 supporting the conductive bar 10 in a radial direction towards the axis of rotation (A), for example when the rotor is stationary.

Under the effect of gravity, certain bars 10 are supported by the channel 13 as shown in FIG. 21.

The bar 10 comprises a median plane (P1), perpendicular to a radial direction.

Two angles α of the same value between 10° and 45°, preferably 30°, are defined between the plane (P1) and two radii of the hole receiving the bar 10, the angles being oriented between the plane (P1) and a plane (P2) passing through the center of the bar 10 in a radial direction, each angle being arranged on either side of the plane (P2).

The hole receiving the bar 10 is connected to a circular channel connecting the two radii separated by the angle α such that the channel 13 comprises the hole receiving the bar 10 and the circular channel in such a way as to maintain the bar in the radial direction directed towards the axis of rotation (A), allowing the cooling fluid to flow beneath the bar and in contact with the bar through the circular channel.

As a variant, the two angles α on both sides of the plane (P2) can be different, for example if the tangential acceleration in a first direction of rotation is greater than in the second direction of rotation.

Figure 22:
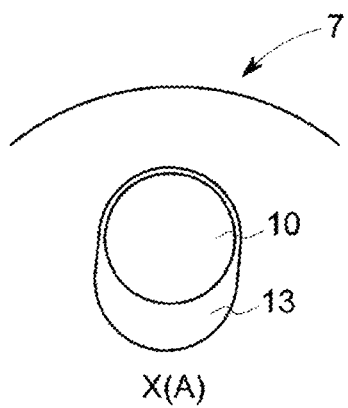
Figure 23:
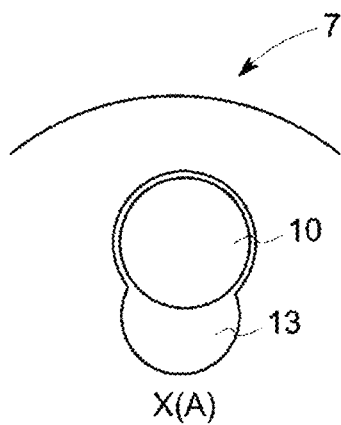

FIGS. 22 and 23 show two examples of cut profiles of the channel 13.

In contrast to the profile shown in FIG. 22, the profile shown in FIG. 23 supports the bar 10 in a radial direction towards the axis of rotation (A).

The surface of the profile shown in FIG. 22 is substantially identical to the surface of the profile shown in FIG. 23 such that the losses in pressure are substantially identical when the cooling fluid passes through both profiles.

The flow of cooling fluid is less disturbed, ensuring a more uniform and more substantial flow of the fluid through the rotor 4 due to the absence of restriction during the passage of the fluid.

To sustain and support the bar 10 during the insertion thereof into the magnetic mass 7 or when the rotor 4 is stopped, a metal plate 9 or a set of magnetic sheets comprising a channel with a profile similar to the channel shown in FIG. 23 may be arranged, for example, at half the length of the magnetic mass 7, or else located for example at two positions substantially one third of the length of the magnetic mass 7.

FIGS. 24, 25, 26, 27, 28 and 29 show examples of profiles which can be machined into the metal plates 9 or cut into the magnetic sheets.

The cooling channels 22 shown in FIGS. 24 to 29 do not open out onto the bar 10, for example in order to avoid the abrasion or corrosion of the bar due to the passage of cooling fluid.

FIGS. 24, 25 and 26 respectively show circular, triangular and half-moon channels 22, situated between the bar 10 and the axis of rotation (A), substantially within a median radial plane of the bar 10.

Figure 27:
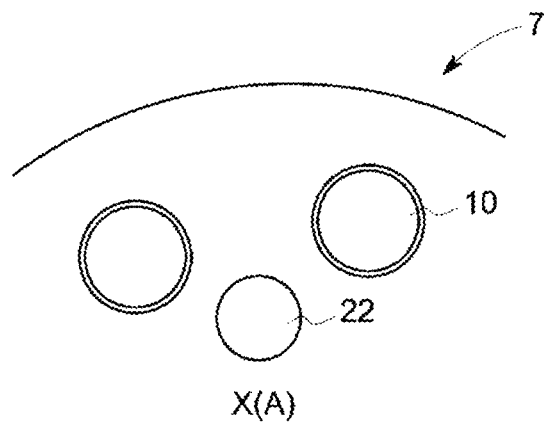
Figure 28:
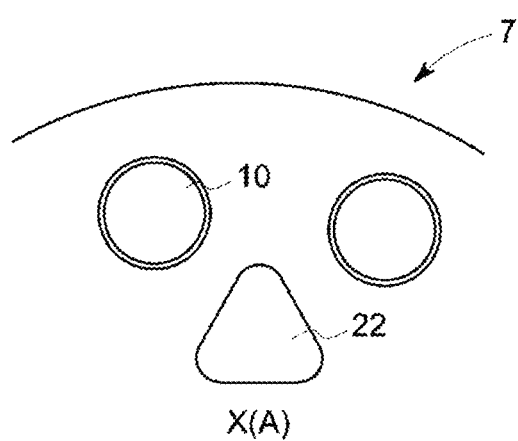
Figure 29:
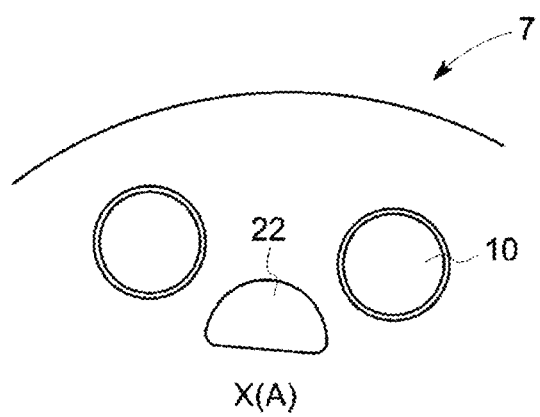

In a variant, FIGS. 27, 28 and 29 show the cooling channels 22 located substantially within a median radial plane of the bar 10 between two adjacent bars.

In a variant, not shown, the conductive bars 10 are rectangular, rectangular with rounded edges or oblong, preferably of copper or copper alloy, aluminum or aluminum alloy, or any other electrically conductive material.

According to yet another variant, the rotor comprises two or more rows of conductive bars 10 or tie rods 12 arranged on two or more substantially concentric diameters, each bar 10 having one or more cooling channels 13, 18, 22.

The cooling means enable the cooling of the rotor by increasing the surface of the rotor for exchanging heat with the coolant and/or by guiding the cooling fluid to the core of the rotor.

The rotor temperature is lowered, thus increasing the overall efficiency of the squirrel cage asynchronous electric machine 1 and making it possible to increase the electric power of the electrical rotary machine 1.

What is claimed is:

1. A rotor for an asynchronous rotary electrical machine with non-through shaft, the rotor comprising:
   a cylindrical, magnetic mass gripped between two mounting flanges of two half-shafts;
   a cooling means capable of cooling the rotor; and
   conductive bars housed within the magnetic mass and distributed substantially uniformly over a diameter of the magnetic mass, the cooling means comprising, for each conductive bar, at least one cooling channel, opening onto the conductive bar according to an axial direction and located within the magnetic mass and at least one through hole arranged within each conductive bar in such a way that the cooling channel communicates with at least one hole arranged on the outer periphery of the magnetic mass.

2. The rotor according to claim 1, the cooling means comprising grooves on a peripheral surface of the magnetic mass, oriented in an axial direction, or else circumferential grooves on the peripheral surface of the magnetic mass.

3. The rotor according to claim 1, further comprising supply means for supplying cooling fluid to the cooling means and connected to the cooling means.

4. The rotor according to claim 3, wherein the cooling channel is located between the conductive bar and an axis of rotation of the rotor.

5. The rotor according to claim 4, wherein the cooling means further comprise a second cooling channel by the supply means for each conductive bar and located between the outer periphery of the magnetic mass and the conductive bar.

6. The rotor according to claim 5, wherein each end of the rotor comprises supply means.

7. The rotor according to claim 6, further comprising a separation member arranged within the cooling channel between at least two peripheral holes in such a way as to separate the flows of coolant fluid flowing from each end of the rotor.

8. The rotor according to claim 7, wherein the channel comprises at least one support member intended to support the conductive bar, such that the passage cross-section of the fluid around the support member is identical to the passage cross-section of the cooling channel.

9. The rotor according to claim 8, wherein the through holes are arranged on the conductive bar in such a way as to cool the hottest part of the conductive bar.

10. The rotor according to claim 2, comprising conductive bars housed within the magnetic mass and uniformly distributed over a diameter of the magnetic mass, the cooling means comprising cooling channels extending in an axial direction within the magnetic mass and located between the conductive bars and a rotational axis of the rotor so as not to communicate with the conductive bars.

11. The rotor according to claim 10, wherein the cooling channels are arranged between two adjacent conductive bars.

12. The rotor according to claim 10, wherein the cooling channels are arranged beneath the conductive bars, within planes that are substantially median in relation to the bars.

13. The rotor according to claim 12, further comprising discharge channels connecting the cooling channels to holes arranged on the outer peripheral surface of the magnetic mass.

14. The rotor according to claim 13, further comprising at least one short-circuit disc at one end of the magnetic mass and supply means located within the short-circuit disc intended to supply cooling fluid to the cooling means.

15. The rotor according to claim 14, wherein the short-circuit disc comprises, on the outer peripheral surface thereof, grooves oriented in an axial direction or else circumferential grooves.

16. The rotor according to claim 15, wherein the magnetic mass comprises compacted magnetic sheets.

17. The rotor according to claim 15, wherein the magnetic mass comprises a monobloc body.

18. The rotor according to claim 15, wherein the magnetic mass comprises a stack of metal plates.

* * * * *